Aug. 13, 1935. G. P. DESPRET 2,010,916
PROCESS OF AND APPARATUS FOR POURING GLASS TO BE FORMED INTO SHEETS OR PLATES
Filed April 4, 1934   3 Sheets-Sheet 1

Aug. 13, 1935. G. P. DESPRET 2,010,916
PROCESS OF AND APPARATUS FOR POURING GLASS TO BE FORMED INTO SHEETS OR PLATES
Filed April 4, 1934   3 Sheets-Sheet 2
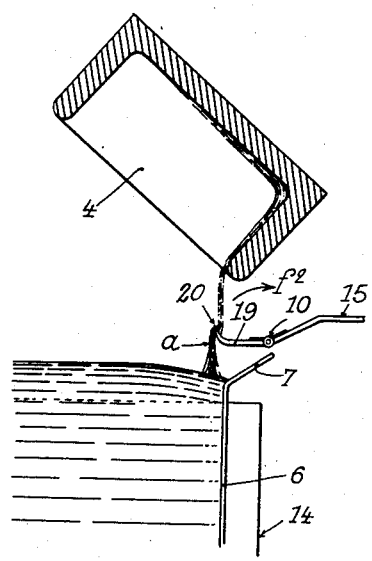
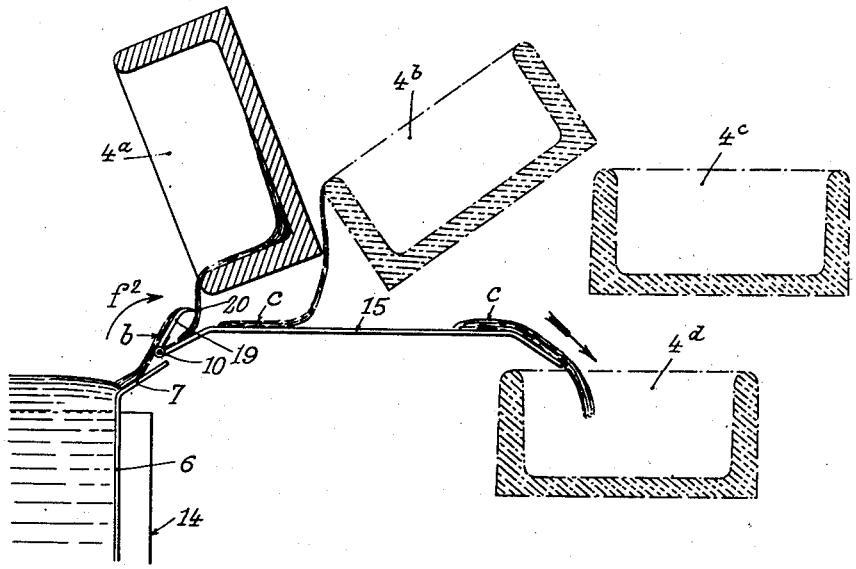

Aug. 13, 1935.   G. P. DESPRET   2,010,916
PROCESS OF AND APPARATUS FOR POURING GLASS TO BE FORMED INTO SHEETS OR PLATES
Filed April 4, 1934   3 Sheets-Sheet 3
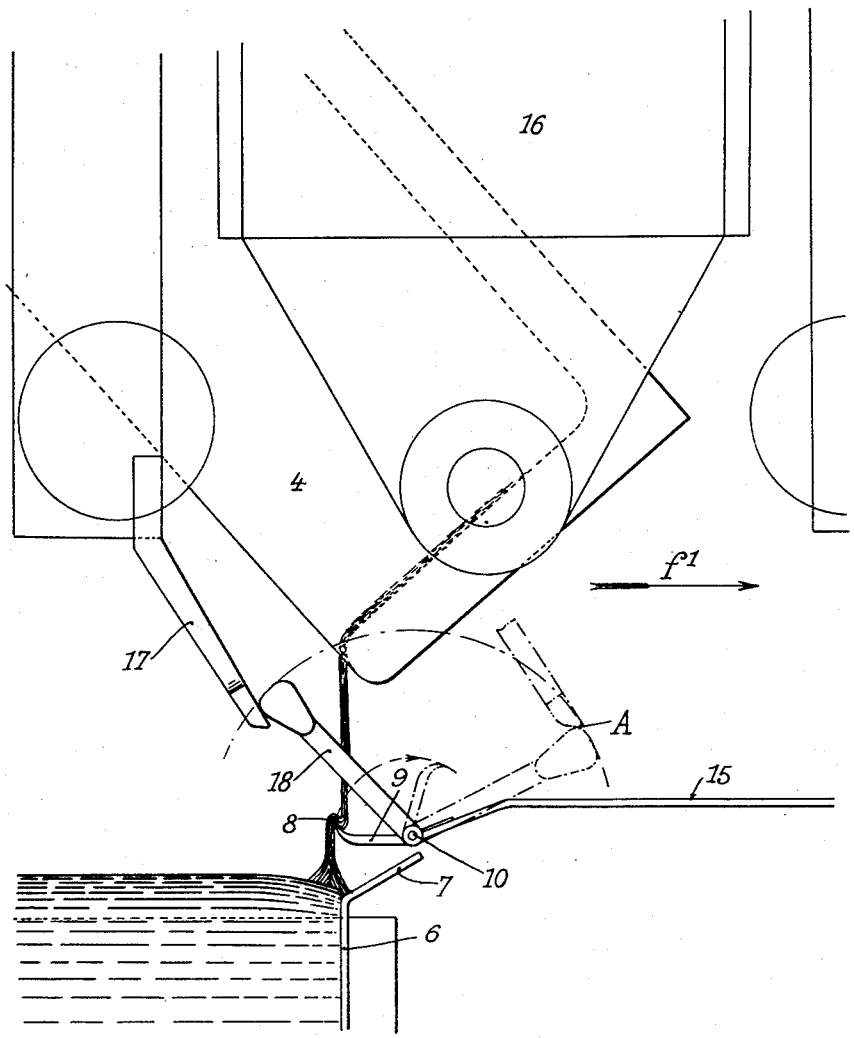

Patented Aug. 13, 1935

2,010,916

UNITED STATES PATENT OFFICE 2,010,916

PROCESS OF AND APPARATUS FOR POURING GLASS TO BE FORMED INTO SHEETS OR PLATES

Georges Paul Despret, Paris, France, assignor to Compagnies Reunies des Glaces et Verres Speciaux du Nord de La France, Boussois-sur-Sambre, Nord, France, a French company Application April 4, 1934, Serial No. 719,014
In France May 5, 1933

12 Claims. (Cl. 49—39)

The present invention relates to a process for the pouring of glass to be formed into sheets or plates and to a pouring table and a rolling apparatus adapted for the application of said process.

It is a known fact that in the manufacture of glass sheets or plates, the liquid glass contained in the pot is poured upon a table against a calibrating roller, or between two rollers forming a rolling apparatus.

The pouring is effected by tipping the pot about an axis which is parallel, perpendicular or oblique with reference to the longitudinal axis of said roller or rollers.

During the pouring operation. the pot is usually moved in a direction parallel to the pair of rollers or to the calibrating roller, in such way as to disengage the rolling apparatus or the table. The pouring continues during the movement of the pot above the rollers or the table. The upturning of the pot takes place immediately after its passage above the exit side plate. The stream of glass descending from the pot continues on its progress towards the exit side plate, owing to the movement of the pouring frame, as well as the mass of glass in the rolling apparatus, taking its position of equilibrium.

In spite of a rapid upturning of the pot at the exit of the rolling apparatus or the table, a certain quantity of glass will descend along the exit side plate and if this glass becomes mixed with the glass already in the hopper, this will produce on the edges of the formed sheets, fringes or like irregular parts. This defect is chiefly to be feared when the pouring takes place in a rolling apparatus, by tipping the pot about an axis perpendicular to the longitudinal axis of the rolling, as in this case the stream of glass, at the time when the pot passes above the exit side plate, descends from a certain height, and the upturning of the pot takes place at the same time.

The invention has for its object an improved process for the pouring of glass sheets or plates upon a pouring table or a rolling apparatus, whereby the aforesaid drawbacks are obviated. This process is chiefly characterized by the fact that it consists in seizing the stream of glass which descends from the pot, before said stream comes directly in contact with the exit side plate during its descent.

The stream thus seized is drawn out in such way as to form in the first place a band of reduced thickness which is received by the upper part of the side plate, the stream which continues to flow being then received upon any suitable support, whence it is brought back into the pot of glass while still very hot.

The invention further relates to improvements in tables or in rolling apparatus for the pouring of glass sheets or plates.

According to the invention, a device adapted to be interposed between the pouring pot and the sheet of glass already poured, before the pot comes adjacent the retaining plate is mounted in the lateral position with reference to the rolling apparatus or the table.

According to one method of execution, the said device consists of a blade (or knife) mounted so as to pivot about an axis which is generally perpendicular to the direction of movement of the pot. in such way that by the pivoting of said blade, when the stream of glass comes upon the same, there is automatically effected a drawing out of the stream of glass situated between this blade and the sheet of glass already poured.

Preferably, the upper part of the side plate, situated on the side next the exit of the pot, forms an inclined plane, upon which is deposited the front end of the drawn out band of glass, in such way that the said band, which is thin, will adhere to the inclined plane while cooling upon the latter, and is thus prevented from falling back upon the mass of the glass which is being rolled.

In the rear of the side plate is mounted a platform upon which is deposited the glass which continues to descend from the pot after it passes over the side plate. This glass, which is thus received upon the platform, is at once drawn into the pot which is upturned and is placed in a suitable position. This method of operating permits to deliver very hot glass into the pot, whence a saving of material on the one hand and a saving of time for the next melting operation, on the other hand.

In the accompanying drawings, which are given solely by way of example:

Fig. 3 is an analogous section, in the case of a rolling apparatus, the pot being represented in the position in which the stream of glass comes upon the pivoted blade.

Fig. 4 is an analogous view, showing the different positions of the pot and the formation of the thin band of glass. both on the retaining plate and upon the horizontal plate which laterally succeeds the said retaining plate.

Fig. 5 is an analogous view, showing a device for the automatic control of the lifting of the pivoting blade.

Figure 1:
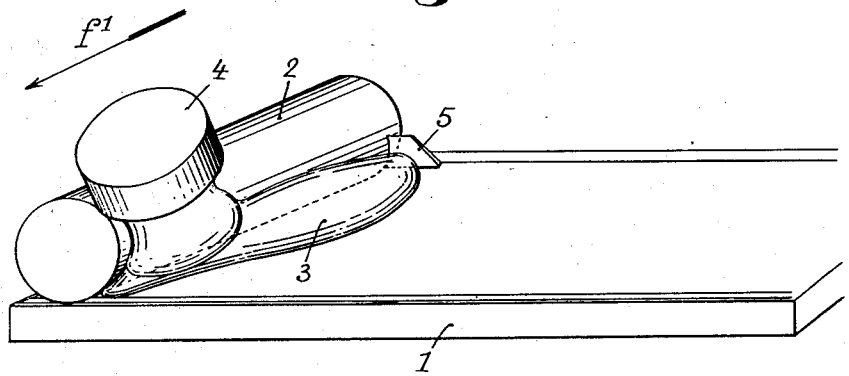
Fig. 1 is a perspective view of a pouring table, showing the pot in an intermediate position; the side plate with inclined surface situated on the side next the exit of the pot is not represented, nor the other devices according to the invention.
Figure 2:
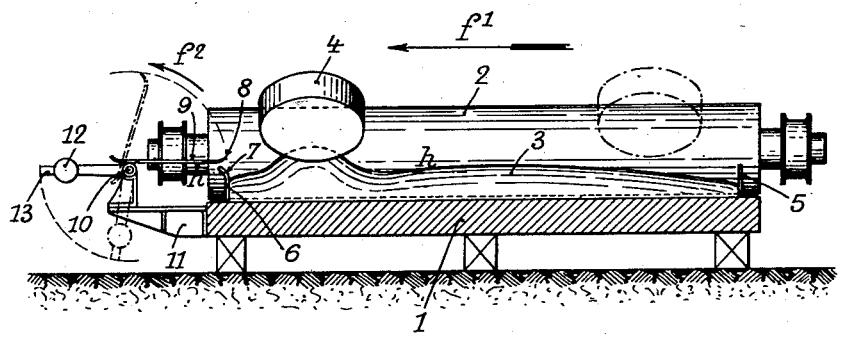
Fig. 2 is a cross-section of an improved pouring table according to the invention.

According to the examples of execution represented in Figs. 1 and 2, the pouring device comprises a pouring table 1 and a roller 2, against which the melted glass is poured at 3 by means of a pot 4 which is displaced laterally in the direction of the arrow $f^1$. On the side opposite the discharge of the glass, the poured glass is stopped by a side plate 5, which is vertical and of a usual type. On the side next the exit of the pot 4, the side plate 6 (Fig. 2) comprises a part which is vertical to a certain height, but it ends at the top in a part 7 which is laterally inclined towards the exterior. The part 7 may be flat or curved.

It is advantageous that the level $h$ of the mass of glass 3 should attain the inclined part 7 of the side plate 6, so as to reduce to a minimum the height of the descent of the glass before the pot 4 passes over the said side plate.

Above the inclined part 7 of the retaining plate 6 is located a blade (or knife) 8, secured to the end of a plate 9 pivoted about an axle 10 carried by a stationary support 11. The device 8—9 is for example balanced by a counterweight 12 mounted on an operating lever 13. This lever may be controlled either by hand or automatically, in any suitable manner.

The operation is as follows. At the time when the pot comes adjacent the blade (or knife) 8, the stream of glass descending from the pot meets the said blade, and from this time onward, it falls upon the plate 9. According as the pot becomes disengaged, the plate 9 is pivoted in the direction of the arrow $f^2$, thus preventing the glass which has fallen upon this plate from again falling upon the sheet of glass 3 in the vicinity of the retaining plate 6.

Fig. 3 represents the pot 4 coming adjacent the exit side plate 6 in a rolling apparatus having two rollers and arranged according to the invention. In this figure, a single roller 14 is represented in a longitudinal view. Fig. 4 represents the same rolling apparatus when the plate 19 is raised. In this figure, the dotted lines indicate different successive positions of the pot 4 such as $4^a, 4^b, 4^c, 4^d$. The knife-carrying plate 19 is connected by suitable hinges 10 with a board or platform 15 of suitable shape. This plate 19 is adapted to turn in the direction of the arrow $f^2$ by the action of any suitable controlling means. The rotation of the knife 20 may obviously be effected by any means; it may be controlled automatically by the passage of the pouring frame, as represented in Fig. 5. In this figure, the pouring frame is represented only by its cylindrical part 16; the pot 4 is shown in Fig. 5, as in Fig. 3, at the time when it passes over the exit side plate 6, moving in the direction of the arrow $f^1$. At this time, a stop 17, secured in a suitable manner to the cylindrical part 16 of the frame, meets a lever 18 secured to the end of the shaft 10 to which the knife-carrying plate 19 is pivoted. The rotation of the knife 20 is thus effected in a very rapid manner, and continues until the stop 17 leaves the lever 18 at A, as shown by the dotted lines.

The method of operating is clearly shown in Figs. 3, 4 and 5. At the moment when the stream of glass $a$ comes over the exit side plate 6, the knife 20 is set in rotation. The stream of glass $a$ is drawn out by reason of this movement, and it is deposited, in part, upon the inclined portion 7 of the retaining plate 6 and in part upon the knife in the form of a drawn-out sheet $b$ which is at once cooled and adheres strongly to the wall. The pot, during its upturning movement, still lets fall a certain amount of glass $c$ upon the platform 15, whence it is drawn into the pot which has been brought to $4d$.

Obviously, the invention is not limited to the methods of execution herein represented and described, which are given solely by way of example.

Having now described my invention what I claim as new and desire to secure by Letters Patent is:

1. In a process for the pouring of glass sheets or plates onto a receiver provided with side plates, the step which consists in pouring a stream of molten glass while moving said stream from one side plate to the other and seizing said stream just before it reaches said latter side plate.

2. A process as claimed in claim 1 further consisting in drawing out said stream so as to form a thin band and allowing said band to deposit separately from the mass of cooled glass.

3. A process as claimed in claim 1 further consisting in drawing out said stream so as to form a thin band, allowing said band to deposit separately from the mass of cooled glass and collecting the end of said stream of glass while it is still hot.

4. In a plant for the pouring of glass sheets or plates, a receiver, side plates for said receiver and means above one of said side plate for seizing the stream of glass just before said stream reaches said side plate.

5. A plant as claimed in claim 4 further comprising means for drawing out said stream so as to form a thin band and means for receiving said drawn band.

6. A plant as claimed in claim 4 further comprising means for drawing out said stream so as to form a thin band, means for receiving said drawn band and a support for receiving the end of the stream of glass.

7. In a plant for the pouring of glass sheets or plates, a receiver, side plates for said receiver and a blade above one of said side plate for seizing the stream of glass just before said stream reaches said side plate, a pivotal axis, substantially horizontal and parallel with said plate, for said blade, whereby the pivotal movement of the blade after the stream of glass has fallen upon said blade, causes a drawing out of said stream of glass.

8. A plant as claimed in claim 7 wherein the upper part of said side plate forms an inclined surface adapted to receive and retain the drawn part of the stream of glass.

9. A plant as claimed in claim 7 further comprising a platform arranged after said side plate relatively to the direction of displacement of said stream and adapted to receive the end of said stream.

10. A plant as claimed in claim 7 further comprising a lever connected with said blade and a counterweight carried by said lever for balancing said blade.

11. A plant as claimed in claim 7 further comprising a lever connected with said blade, a counterweight carried by said lever for balancing said blade and means for operating said lever when said stream has reached said blade.

12. A plant as claimed in claim 7 further comprising a lever connected with said blade, a counterweight carried by said lever for balancing said blade, a pouring pot, a movable frame for carrying said pot and means carried by said frame for operating said lever when the pot comes exactly above said blade.

GEORGES PAUL DESPRET.